United States Patent
Kikuchi et al.

(10) Patent No.: US 9,451,153 B2
(45) Date of Patent: Sep. 20, 2016

(54) FOCUS ADJUSTING APPARATUS, CAMERA SYSTEM, AND FOCUS ADJUSTING METHOD

(71) Applicant: Olympus Corporation, Hachioji-shi, Tokyo (JP)

(72) Inventors: Tetsuo Kikuchi, Tokyo (JP); Takeshi Kindaichi, Tokyo (JP)

(73) Assignee: Olympus Corporation, Tokyo (JP)

( * ) Notice: Subject to any disclaimer, the term of this patent is extended or adjusted under 35 U.S.C. 154(b) by 56 days.

(21) Appl. No.: 14/333,831

(22) Filed: Jul. 17, 2014

(65) Prior Publication Data

US 2014/0327810 A1 Nov. 6, 2014

Related U.S. Application Data

(63) Continuation of application No. PCT/JP2013/050900, filed on Jan. 18, 2013.

(30) Foreign Application Priority Data

Feb. 6, 2012 (JP) ................................. 2012-023515

(51) Int. Cl.
*H04N 5/225* (2006.01)
*G02B 13/16* (2006.01)
(Continued)

(52) U.S. Cl.
CPC ............ *H04N 5/23212* (2013.01); *G02B 7/09* (2013.01); *G02B 7/36* (2013.01); *H04N 5/23209* (2013.01)

(58) Field of Classification Search
CPC .................... H04N 5/23212; H04N 5/23209; H04N 7/09; H04N 7/36
USPC ................ 348/335, 340, 345, 348, 350, 352
See application file for complete search history.

(56) References Cited

U.S. PATENT DOCUMENTS

2005/0285967 A1* 12/2005 Suda .................. H04N 5/23212
348/345
2007/0177862 A1 8/2007 Terayama
(Continued)

FOREIGN PATENT DOCUMENTS

JP 2007-206433 8/2007
JP 2008-015274 1/2008
(Continued)

OTHER PUBLICATIONS

International Search Report for PCT/JP2013/050900 (1 pg.).
(Continued)

*Primary Examiner* — Yogesh Aggarwal
(74) *Attorney, Agent, or Firm* — John C. Pokotylo; Straub & Pokotylo

(57) ABSTRACT

Lh indicates the amount of image-surface movement of a photographic subject; Ls, a scan driving range; Lps, a scan driving range required to detect a peak; Li, the amount of initial position driving. Based on the speed of a photographic subject (inclination of a photographic-subject movement amount profile H), a body controlling unit sets Li as a driving amount and a driving direction of initial position driving in such a manner as to satisfy Lh<(Ls−Lps+Li), and performs initial position driving to move a focus lens, with the result that the profile H and a scan driving amount profile S of the focus lens intersect with each other within a section k4 where contrast AF is performed. Then, a scan driving operation is performed within the section k4, thereby detecting an in-focus position without fail regardless of the image-surface movement speed of the photographic subject (inclination of the profile H).

14 Claims, 12 Drawing Sheets

(51) Int. Cl.
 *H04N 5/232* (2006.01)
 *G02B 7/36* (2006.01)
 *G02B 7/09* (2006.01)

(56) References Cited

U.S. PATENT DOCUMENTS

| | | |
|---|---|---|
| 2008/0007644 A1 | 1/2008 | Matsumoto |
| 2009/0284612 A1 | 11/2009 | Abe |
| 2009/0284643 A1 | 11/2009 | Shibuno |
| 2009/0285572 A1 | 11/2009 | Shibuno |
| 2009/0322932 A1 | 12/2009 | Ishiwata |
| 2011/0063472 A1 | 3/2011 | Kitahira |
| 2011/0063497 A1 | 3/2011 | Kawazoe |
| 2011/0080488 A1 | 4/2011 | Okamoto |
| 2011/0091194 A1 | 4/2011 | Isaka |
| 2012/0070139 A1 | 3/2012 | Shibuno |
| 2012/0212635 A1 | 8/2012 | Abe |
| 2012/0307131 A1 | 12/2012 | Isaka |
| 2012/0327290 A1* | 12/2012 | Matsuzawa ............ G02B 7/102 348/349 |

FOREIGN PATENT DOCUMENTS

| | | |
|---|---|---|
| JP | 2010-008695 | 1/2010 |
| JP | 2010-015131 | 1/2010 |

OTHER PUBLICATIONS

Office Action to corresponding Japanese Patent Application No. 2012-023515, mailed on Jan. 5, 2016 (3 pgs.) with translation (3 pgs.).

First Notice of the Opinion on Examination for corresponding Chinese Patent Application No. 201380007132.0, mailed on Oct. 23, 2015 (14 pgs.) with translation (15 pgs.).

* cited by examiner

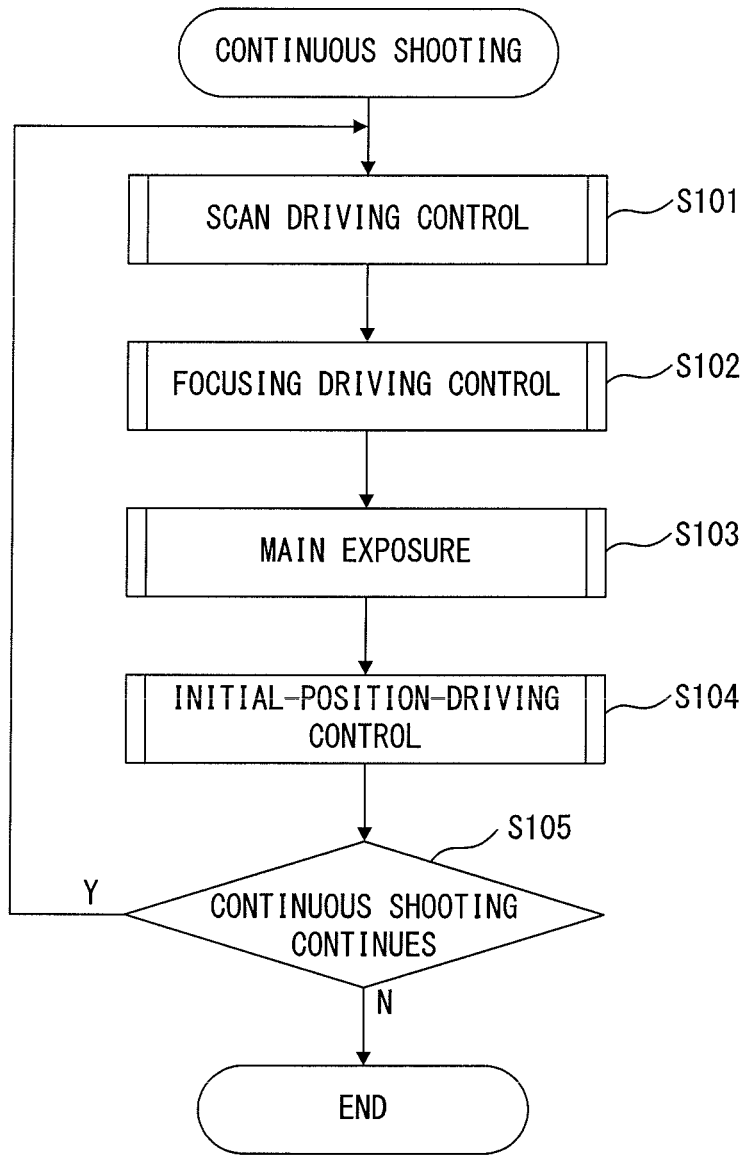
F I G. 2

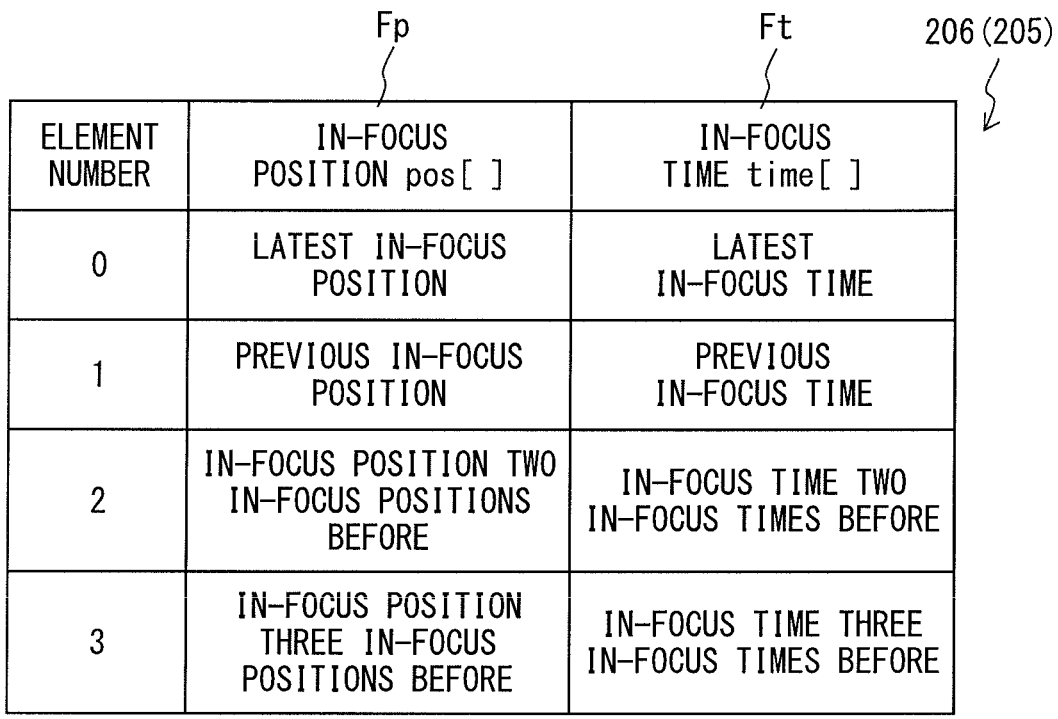
F I G. 5

FOCUS ADJUSTING APPARATUS, CAMERA SYSTEM, AND FOCUS ADJUSTING METHOD

CROSS-REFERENCE TO RELATED APPLICATION

This application is based upon and claims the benefit of priority of the prior Japanese Patent Application No. 2012-023515, filed Feb. 6, 2012, the entire contents of which are incorporated herein by reference.

This is a Continuation application of PCT Application No. PCT/JP2013/050900, filed Jan. 18, 2013, which was not published under PCT Article 21(2) in English.

FIELD

The present invention relates to a focus adjusting apparatus, a camera system, and a focus adjusting method.

BACKGROUND

A known camera as an imaging system constituted by a photographing optical system and an imager has a focus adjusting function to enable the tracking of a moving body in accordance with contrast AF to adjust the focus by searching for a position corresponding to the greatest contrast while moving a focus lens on the basis of an image obtained by the imager.

Patent document 1 (Japanese Laid-open Patent Publication No. 2010-015131) discloses a focus adjusting apparatus that uses a contrast AF scheme wherein a focus is adjusted by tracing a moving body. According to a method disclosed in patent document 1, before a main exposure is started, both a diaphragm and a focus lens are simultaneously driven under predictive auto-focusing on moving subject, thereby adjusting the focus in conformity with the main exposure. Patent document 1 also discloses driving a focus lens after performing a main exposure, in preparation for a scan driving operation in a next AF operation.

SUMMARY

A first viewpoint of the invention provides a focus adjusting apparatus that controls the movement of a focus lens movable in an optical axis direction and included in a photographing optical system that forms an image from light from a photographic subject, the focus adjusting apparatus including: an imager that generates an image signal by imaging a photographic-subject image formed by the photographing optical system; a lens driving unit that moves the focus lens; and a controlling unit that causes the lens driving unit to move the focus lens, that causes the imager to perform an imaging operation, that performs a scan operation so as to detect, on the basis of the image signal output by the imager, a position where the focus lens is to be located to cause a contrast of the photographic-subject image to reach a peak, and that controls locating of the focus lens at a position where the focus lens is in focus, wherein the controlling unit includes: a photographic-subject-speed detecting unit that detects the movement speed of the photographic subject; and a scan controlling unit that, based on the movement speed of the photographic subject detected by the photographic-subject-speed detecting unit, determines whether to perform initial position driving to move the focus lens before the scan operation is performed.

A second viewpoint of the invention provides a camera system including a camera body on which an interchangeable lens is mountable, the interchangeable lens including: a focus lens movable in an optical axis direction and included in a photographing optical system that forms an image from light from a photographic subject; and a lens driving unit to move the focus lens, wherein the camera body includes: an imager that generates an image signal by imaging a photographic-subject image formed by the photographing optical system; and a controlling unit that instructs the interchangeable lens to cause the lens driving unit to move the focus lens, that causes the imager to perform an imaging operation, that performs a scan operation so as to detect, on the basis of a plurality of image signals output by the imager, a position where the focus lens is to be located to cause a contrast of the photographic-subject image to reach a peak, and that controls locating of the focus lens at a position where the focus lens is in focus, wherein the controlling unit includes: a photographic-subject-speed detecting unit that detects the movement speed of the photographic subject; and a scan controlling unit that, based on the movement speed of the photographic subject detected by the photographic-subject-speed detecting unit, makes a setting to perform or to not perform initial position driving to move the focus lens before the scan operation is performed, and that gives the interchangeable lens an instruction.

A third viewpoint of the invention provides a focus adjusting method for a camera system that includes a camera body on which a photographing optical system is mountable, the photographing optical system including a focus lens movable in an optical axis direction, and forming an image from light from a photographic subject, and the focus adjusting method including the steps of: calculating the movement speed of the photographic subject from a plurality of past in-focus positions for the photographic subject recorded in chronological order; in the determining of an in-focus position for the photographic subject by performing a certain amount of scan driving of the focus lens at a certain speed, determining based on the movement speed of the photographic subject whether to perform initial position driving of the focus lens prior to the scan driving; moving the focus lens to the in-focus position determined according to the scan driving; and imaging the photographic subject.

BRIEF DESCRIPTION OF DRAWINGS

FIG. 2 is a flowchart illustrating exemplary processes performed by a focus adjusting apparatus in accordance with an embodiment of the invention;

FIG. 5 illustrates exemplary configurations of data on in-focus positions of a focus adjusting apparatus in accordance with an embodiment of the invention;

DESCRIPTION OF EMBODIMENTS

The embodiment discloses, for example, as a first aspect, an automatic focus adjusting technology for adjusting a focus by performing a certain amount of scan driving of a focus lens at a certain speed under image surface conversion irrespective of the type and the focal length of the lens.

In a second aspect, the automatic focus adjusting technology according to aspect 1 further includes determining, in accordance with the movement speed of a photographic subject, whether to perform initial driving of the focus lens prior to the scan driving.

In a third aspect, the automatic focus adjusting technology according to aspect 2 further includes determining the direction of the initial driving of the focus lens in accordance with the movement speed of the photographic subject.

In a fourth aspect, the automatic focus adjusting technology according to aspect 2 or 3 further includes performing a certain amount of initial driving of the focus lens under image surface conversion irrespective of the type and the focal length of the lens.

The following will describe embodiments of the invention in detail with reference to the drawings.

Embodiment 1

Figure 1:
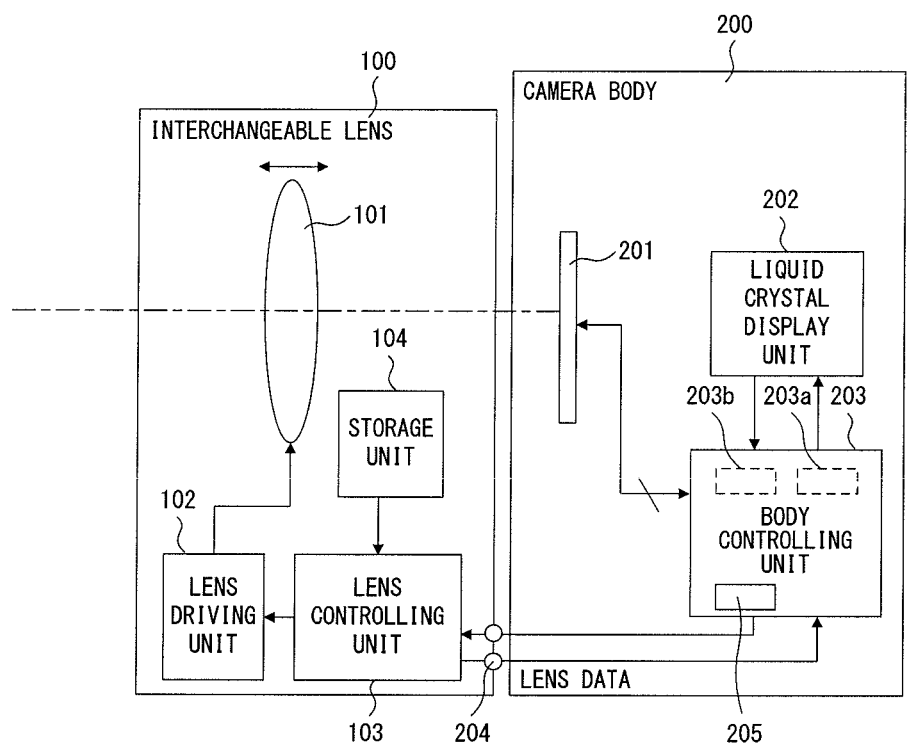
FIG. 1 is a block diagram illustrating an exemplary configuration of a focus adjusting apparatus in accordance with an embodiment of the invention.

FIG. 1 is the configuration diagram of a camera system in accordance with an embodiment of the invention. The camera system in accordance with the embodiment includes an interchangeable lens 100 and a camera body 200 (focus adjusting apparatus). The interchangeable lens 100 is attachable to a lens mount unit (not illustrated) that includes amount contact 204 and is included in the camera body 200.

The camera body 200 includes an imager 201, a body controlling unit 203, and a liquid crystal display unit 202. The body controlling unit 203 is a large scale integration circuit (LSI) wherein a CPU, a controlling circuit to control individual parts within the camera body 200, and a signal processing circuit to perform various types of signal processing are integrated with each other.

The body controlling unit 203 in accordance with the embodiment functions as, for example, a focus adjusting apparatus that performs focusing control under contrast AF by controlling the interchangeable lens 100.

The body controlling unit 203 controls various operation sequences performed by the camera body 200. The body controlling unit 203 controls operations of individual parts within the camera body 200 and outputs a control signal such as a command to a lens controlling unit 103. The body controlling unit 203 may control operations of the imager 201. The body controlling unit 203 may convert an image signal output from the imager 201 into a digital signal and perform various types of signal processing such as white balance control. The body controlling unit 203 may output image data obtained as a result of various types of signal processing to the liquid crystal display unit 202. The body controlling unit 203 outputs to the lens controlling unit 103 a synchronization signal to establish the synchronism between a photographing operation by the imager 201 and an operation to drive a focus lens 101 (the operation to drive the focus lens 101 will be described hereinafter).

In the embodiment, the body controlling unit 203 includes: a scan control logic 203a (scan controlling unit) to perform scan controlling operations illustrated in, for example, the flowcharts in FIGS. 2, 7, and 12, all described hereinafter; and a photographic-subject-speed detection logic 203b (photographic-subject-speed detecting unit) to detect, in a manner described hereinafter, the movement speed of a photographic subject that the scan control logic 203a needs to recognize.

According to the descriptions above, the body controlling unit 203 is an LSI wherein a CPU, a controlling circuit to control individual parts within the camera body 200, and a signal processing circuit to perform various types of signal processing are integrated with each other. However, the body controlling unit 203 may consist of a plurality of LSIs.

The body controlling unit 203, the scan control logic 203a, and the photographic-subject-speed detection logic 203b are achievable as, for example, software, firmware, or a hardware circuit. Although the scan control logic 203a and the photographic-subject-speed detection logic 203b are illustrated as separate elements for the sake of description, these logics may be achieved as a single functional block of software or a hardware circuit. The camera body 200 includes a release button to be pressed by a user to trigger a shooting operation and a storage unit to store image data obtained via the shooting operation, neither of which is depicted in FIG. 1.

The liquid crystal display unit 202 may display an image that is based on image data generated by the body controlling unit 203 and intended for displaying.

The imager 201 may convert an optical image incident through the interchangeable lens 100 into an image signal. The imager 201 may consist of a CCD image sensor or a MOS image sensor.

The body controlling unit 203 can detect an in-focus state on the basis of the contrast of an image signal output by the imager 201. The body controlling unit 203 performs a photographing operation under the imager 201 while moving the focus lens, which will be described hereinafter, and obtains a plurality of image signals that depend on positions of the focus lens. The body controlling unit 203 detects a position where the focus lens is to be located to cause the contrast of an image signal from among the plurality of image signals corresponding to a predetermined AF region to reach a peak, and drives the focus lens to that position to put it in an in-focus state. Such a hill-climbing AF operation can be performed.

The interchangeable lens 100 includes the focus lens 101 (photographing optical system), a lens driving unit 102 (photographing optical system), the lens controlling unit 103, and a storage unit 104.

The lens controlling unit 103 is an LSI wherein a CPU and a controlling circuit to control individual parts within the interchangeable lens 100 are integrated with each other. Based on a control signal output from the body controlling unit 203, the lens controlling unit 103 may control the driving of the focus lens 101 by sending a control signal to the lens driving unit 102. The lens controlling unit 103 moves the focus lens 101 in the optical axis direction on the basis of the control signal output from the body controlling unit 203.

The interchangeable lens 100 also includes a storage unit 104 storing information specific to the interchangeable lens 100. At a request from the body controlling unit 203, the lens controlling unit 103 transmits information from the storage unit 104 to the body controlling unit 203.

According to the descriptions above, the lens controlling unit 103 is an LSI wherein a CPU and a controlling circuit to control individual parts within the interchangeable lens 100 are integrated with each other. However, the lens controlling unit 103 may consist of a plurality of LSIs. The interchangeable lens 100 includes a diaphragm controlling mechanism and a zoom function, neither of which is depicted in FIG. 1.

With reference to FIG. 2, the following will describe an exemplary basic operation of the camera body 200 in accordance with the embodiment. FIG. 2 illustrates the flowchart of a continuous shooting operation that includes an AF operation performed by the body controlling unit 203.

In step S101, the body controlling unit 203 performs a photographing operation while moving the focus lens 101, and performs a scan driving operation to search for a position where the focus lens is to be located to cause the contrast of an image signal corresponding to a predetermined AF region to reach a peak.

During the continuous shooting operation, to maintain a continuous-shooting scene rate at a fixed value, i.e., to make intervals between shooting scenes constant, a fixed number of photographing frames are used in the scan driving operation.

Specifically, in the scan driving operation, the body controlling unit 203 transmits operation parameters associated with a command to the lens controlling unit 103 via a lens mount so as to cause the lens controlling unit 103 to perform the scan driving operation. The operation parameters are, for example, the direction, the speed, and the amount of the driving of the focus lens 101 in the scan driving operation. The lens controlling unit 103 receives the command and the operation parameters and drives the focus lens 101 in accordance with the settings that depend on the operation parameters.

During the scan driving operation, the body controlling unit 203 transmits a synchronization signal associated with the photographing operation to the lens controlling unit 103 via the lens mount. In response to the synchronization signal, the lens controlling unit 103 obtains and stores the position of the focus lens 101. After the scan driving operation is finished, the lens controlling unit 103 transmits the stored positional information of the focus lens 101 to the body controlling unit 203 via the lens mount. The body controlling unit 203 calculates AF evaluation values from image data of a plurality of photographing frames obtained in the scan driving operation and determines the peak AF evaluation value. Using positional information of the focus lens 101 that corresponds to the AF evaluation values, the body controlling unit 203 also calculates the in-focus position of the focus lens 101 that corresponds to the peak AF evaluation value.

In step S102, the body controlling unit 203 performs focusing driving to drive the focus lens 101 to the in-focus position. In the focusing driving, after the scan driving operation ends, an in-focus position detected in the scan driving operation at that time and history information of an in-focus position detected in a scan driving operation in the past are used to forecast-calculate an in-focus position in the next main exposure process. The focus lens 101 is driven to the forecast-calculated in-focus position.

Specifically, the body controlling unit 203 transmits a command and the forecast-calculated in-focus position to the lens controlling unit 103 so as to cause the lens controlling unit 103 to perform the focusing driving operation. Upon receipt of the command and the forecast-calculated in-focus position, the lens controlling unit 103 drives the focus lens 101 to the in-focus position.

In step S103, the body controlling unit 203 performs a main exposure operation to cause the imager 201 to shoot a still image.

In step S104, the body controlling unit 203 performs initial-position-driving control. In the initial-position-driving control, irrespective of whether a photographic subject is standing still or moving, the focus lens 101 is driven to an optimum position so that the peak of the contrast can be detected during a next scan operation. The body controlling unit 203 transmits a command and operation parameters such as a driving direction, a driving amount, and a driving speed to the lens controlling unit 103 so as to cause the lens controlling unit 103 to perform an initial-position-driving operation. The lens controlling unit 103 drives the focus lens 101 to a designated position on the basis of the command and the operation parameters.

In step S105, the body controlling unit 203 detects an operational input provided using, for example, a release button and determines whether to continue the continuous shooting operation. When determining to continue the continuous shooting operation, the body controlling unit 203 returns to step S101 and repeats the operations. When determining to end the continuous shooting operation, the body controlling unit 203 ends the process of the flowchart.

Figure 3:
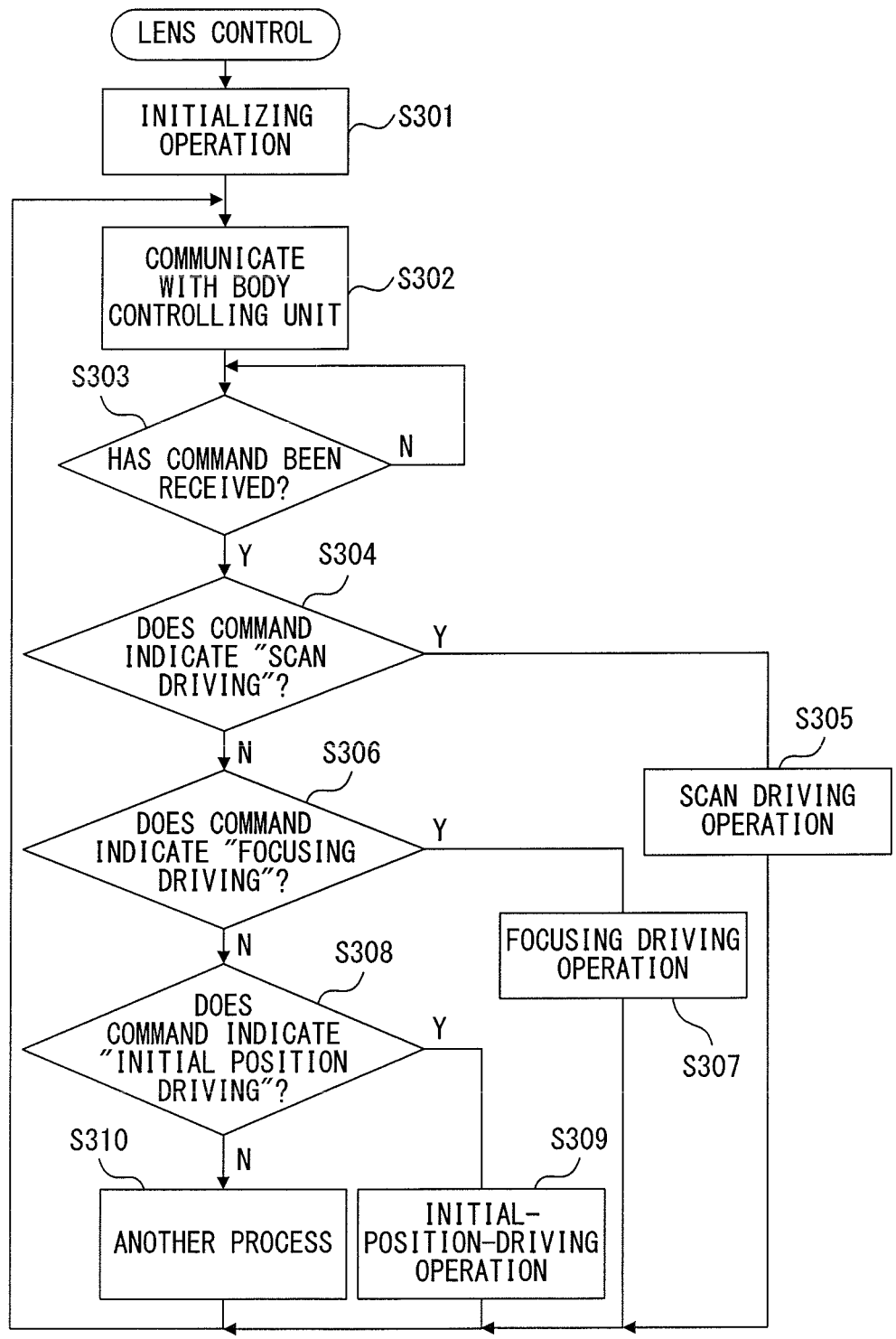
FIG. 3 is a flowchart illustrating exemplary controlling operations by a lens controlling unit of a camera system in accordance with an embodiment of the invention.

Next, with reference to FIG. 3, the following will describe an exemplary lens controlling operation that includes scan driving of the interchangeable lens 100 performed by the camera body 200 in accordance with the embodiment.

FIG. 3 is a flowchart illustrating control operations performed by the lens controlling unit 103. Turning on the camera body 200 with the interchangeable lens 100 mounted thereon causes power to be supplied from the camera body 200 to the interchangeable lens 100 and causes the lens controlling unit 103 to start the process of the flowchart.

In step S301, the lens controlling unit 103 performs an operation to initialize individual parts within the interchangeable lens 100.

In step S302, the lens controlling unit 103 communicates with the body controlling unit 203 and transmits various pieces of lens data stored in a storage unit (memory) within the interchangeable lens 100 to the body controlling unit 203.

In step S303, the lens controlling unit 103 determines whether a command has been received from the body controlling unit 203; when determining that a command has not been received, the lens controlling unit 103 repeatedly performs step S303, i.e., the lens controlling unit 103 is put in a reception waiting state. When a command is received, the flow shifts to step S304.

In step S304, the lens controlling unit 103 determines whether the received command indicates "scan driving". When "scan driving" is indicated, the flow shifts to step S305, where the lens controlling unit 103 performs the scan driving operation on the basis of a parameter associated with the command.

When the received command does not indicate "scan operation", the flow shifts to step S306, where the lens controlling unit 103 determines whether the received command indicates "focusing driving". When "focusing driving" is indicated, the flow shifts to step S307, where the lens controlling unit 103 performs the focusing driving operation on the basis of a parameter associated with the command.

When the received command does not indicate "focusing driving", the flow shifts to step S308, where the lens controlling unit 103 determines whether the received command indicates "initial position driving". When "initial position driving" is indicated, the flow shifts to step S309, where the lens controlling unit 103 performs the initial-position-driving operation on the basis of a parameter associated with the command.

When the received command does not indicate "initial position driving", the flow shifts to step S310, where the lens controlling unit 103 performs a process corresponding to another command. The lens controlling unit 103 then returns to step S302 and repeats the aforementioned processes.

Figure 4:
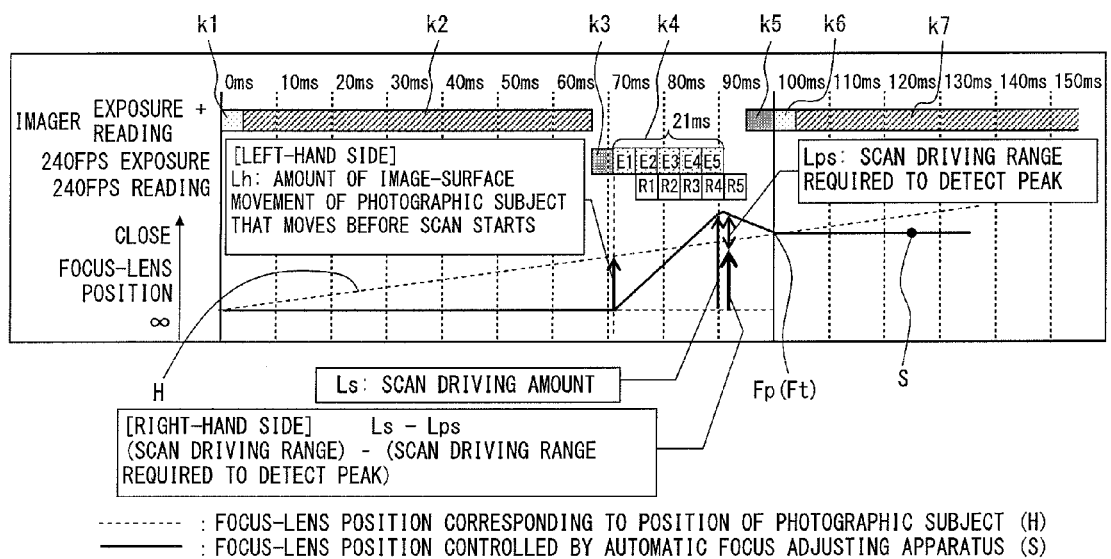
FIG. 4 illustrates an exemplary AF process performed during a continuous shooting operation of a focus adjusting apparatus in accordance with an embodiment of the invention.

With reference to FIG. 4, the following will describe an exemplary auto focusing (AF) operation in continuous shooting by the camera body 200 in accordance with the embodiment.

FIG. 4 illustrates an AF operation in a continuous shooting operation and indicates operations of the imager 201 and operations of the focus lens 101, wherein time is indicated on the abscissa. The ordinate indicates an amount converted into an image-surface position, i.e., indicates the amount of image-surface movement caused by movement of a photographic subject and movement of the focus lens 101.

As indicated by "IMAGER: EXPOSURE+READING", during the period from t=0 ms to t=4 ms (section k1), the imager 201 performs the main exposure operation (shooting) for a predetermined still-image scene in the continuous shooting operation and, during the period from t=4 ms to t=67 ms (section k2), performs an operation to read exposed photographic data. The operations correspond to the "main exposure operation" of step S103 in the flowchart of FIG. 2.

When the reading operation corresponding to the main exposure operation ends, the "scan driving control" corresponding to step S101 in the flowchart of FIG. 2 is performed. Note that FIG. 4 indicates a situation in which the "initial-position-driving control" of step S104 is not performed.

At the beginning of the scan driving operation, and, during the period from t=67 ms to t=71 ms (section k3), the body controlling unit 203 performs an operation to reset the imager 201 in conformity with the scan driving operation. At t=71 ms, the body controlling unit 203 starts an exposure operation and a reading operation at 240 fps in conformity with the scan driving operation (section k4). The exposure operation and the reading operation are each performed for five frames in conformity with the scan driving operation (E1-E5, R1-R5).

The body controlling unit 203 transmits a command to perform the scan driving operation to the lens controlling unit 103 together with driving parameters. The lens controlling unit 103 starts to drive the focus lens 101 in a designated direction at a designated speed for a predetermined period of time (or a predetermined amount of driving).

"240 fps EXPOSURE" indicates an exposure operation performed by the imager 201, and "240 fps READING" indicates a reading operation performed by the imager 201. After a first exposure operation (E1) is performed, a second exposure operation (E2) is performed in parallel with a reading operation (R1) to read the photographic data obtained in the first exposure operation. Then, processing is performed in a similar manner, and a fifth exposure operation (E5) and a fifth reading operation (R5) are performed. The period of the exposure time for five frames is about 21 ms.

During the scan driving operation, the body controlling unit 203 transmits, to the lens controlling unit 103, a synchronization signal that is in synchrony with the photographing operation. In accordance with the synchronization signal, the lens controlling unit 103 obtains and stores the position of the focus lens 101.

Figure 6:
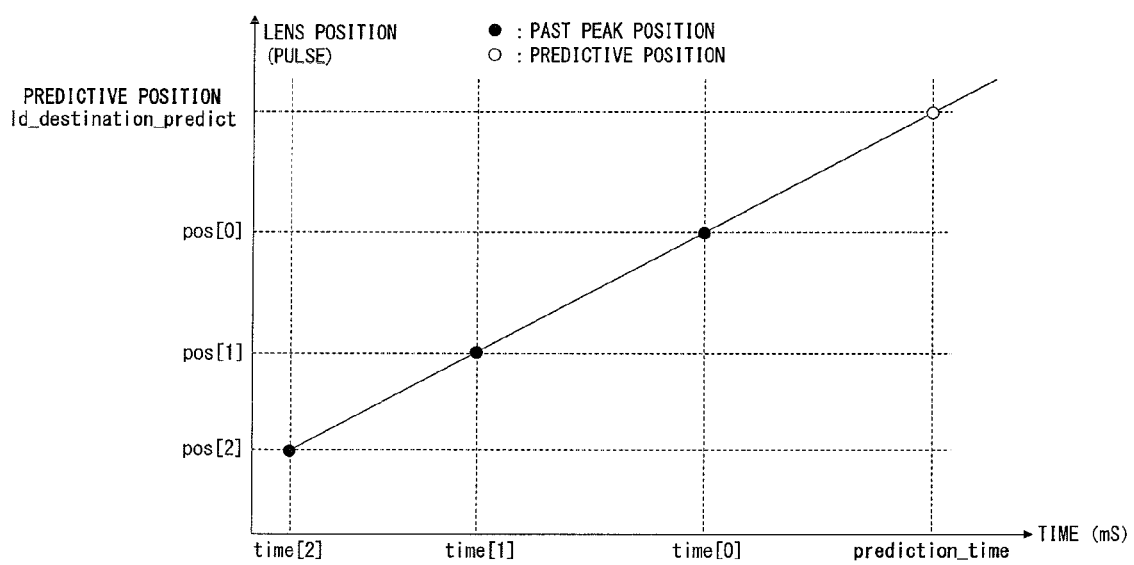
FIG. 6 illustrates an exemplary position where a moving photographic subject is predicted by a focus adjusting apparatus in accordance with an embodiment of the invention to be located.

With reference to FIGS. 5 and 6, the following will describe an example of the "focusing driving operation" that is performed in the camera body 200 in accordance with the embodiment and that corresponds to step S102 of the flowchart in FIG. 2.

In the focusing driving operation, at the time (t=100 ms) when the main exposure operation (shooting) for a still image (section k6) starts after the operation of resetting the imager 201 is performed in section k5 in FIG. 4, the focus lens 101 is put in focus on the photographic subject, and a scan driving amount profile S (scan operation) becomes constant at a position where this profile crosses a photographic-subject movement amount profile H. In section k7, the photographic data obtained in the main exposure operation (shooting) in section k6 is read.

When the scan driving operation is completed, the body controlling unit 203 communicates with the lens controlling unit 103 and obtains the positional information of the focus lens 101 for five frames for which the scan driving operation is being performed. Then, in accordance with the relationships between the positions of the focus lens 101 and AF evaluation values for the five frames obtained in the scan driving operation, a quadratic-based approximate curve is determined using the method of least squares. The maximum value indicated by the approximation expression of the approximate curve determined in that manner corresponds to an in-focus position at the time of the scan driving operation.

FIG. 5 depicts an exemplary storage format of in-focus position data 206 related to an in-focus position and stored in a body storage unit 205 (memory) installed in the body controlling unit 203. A pair of an in-focus position pos [ ] and a in-focus time time[ ] is array data with four array elements and is updated in a first-in first-out (FIFO) manner.

The in-focus position calculated in the process described above is assigned to pos[0] as the latest in-focus position data, and the time of detecting the in-focus position is assigned to time[0] as the latest in-focus time.

As described above, when an in-focus position is detected by the scan driving operation, past in-focus position history information of the data with four array elements is shifted by one column, and the latest in-focus position information is assigned to pos[0] and time[0]. That is, pos[i+1]=pos[i] and time [i+1]=time[i] (i=0 to 3) are set, and the latest in-focus position information is assigned to pos[0] and time[0]. Hence, four in-focus positions and four in-focus times, all including the latest information, are stored.

Next, using history information related to an in-focus position calculated in the scan driving operation and corresponding to a shooting scene obtained during a continuous shooting operation, the body controlling unit 203 determines a straight-line approximate expression for the in-focus position and an in-focus time using the method of least squares (in-focus position=a×in-focus time+b). The straight-line approximation is applicable on the assumption that the movement speed of a photographic subject is constant.

FIG. 6 depicts the relationship between an in-focus position and an in-focus time. A straight-line approximation expression is determined by applying the method of least squares for the three pairs of data (time[0], pos[0]), (time[1], pos[1]), and (time[2], pos[2]), i.e., pairs of an in-focus time Ft and an in-focus position Fp. In accordance with the parameters (a, b) of the determined straight-line approximation expression and the time (tpd) of the current main exposure, an in-focus position (lddp) of the current main exposure is predicted and calculated according to the following expression, expression (1).

$$lddp = a \times tpd + b \qquad \text{Expression (1)}$$

The in-focus position lddp is a focusing driving target position, i.e., a target position to which the focus lens 101 is driven just before the main exposure is performed.

The parameter a is stored in a storage unit (not illustrated) as the movement speed of the photographic subject.

The body controlling unit 203 transmits the in-focus position lddp as the focusing driving target position to the lens controlling unit 103 together with a command to perform the focusing driving operation. Upon receipt of the command, the lens controlling unit 103 drives the focus lens 101 to the focusing driving target position.

Next, before the initial-position-driving control is described, with reference to expressions (2)-(5), descriptions will be given in detail of an AF operation performed to track a photographic subject that moves during a continuous shooting operation.

The focus adjusting apparatus in the camera body 200 in accordance with the embodiment performs an AF operation on the condition that expression (2) below be satisfied, so that the peak of the contrast (AF evaluation value) can be detected irrespective of the image-surface movement speed of the photographic subject.

$$(Lh) \square (Ls) - (Lps) + (Li) \qquad \text{Expression (2)}$$

In expression (2), Lh indicates the amount of movement of an image surface of a photographic subject [mm]; Ls, a scan driving range [mm]; Lps, a scan driving range required to detect a peak [mm]; Li, the amount of initial position driving [mm].

The driving range (Ls, Lps), the amount of movement (Lh), and the amount of driving (Li) are values converted into the amounts of image movement on an image surface. The signs of these values correspond to directions in which the focus lens 101 is driven; "+" indicates a close direction, and "−" indicates a ∞ direction.

Assume that, during the scan driving operation, the photographic subject continues to move at the same image-surface movement speed as the image-surface movement speed at which the photographic subject moves during the time period from the start of the previous main exposure to the start of the current scan driving.

The body controlling unit 203 actually detects, as will be described hereinafter, the amount of the movement of the photographic subject made during the time period from the start of the main exposure to the start of scan driving and uses the detected amount as the "amount of the image-surface movement Lh of the photographic subject" in expression (2). The "amount of the image-surface movement Lh of the photographic subject" in expression (2) indicates the amount of the image-surface movement of the photographic subject that moves before scan driving starts (period from the start of the main exposure to the start of scan driving), and is indicated by expression (3). That is, the amount of the image-surface movement Lh of the photographic subject [mm] is indicated by the following expression.

$$(Lh) = (Tc - Ts) \times (Vh) \qquad \text{Expression (3)}$$

In expression (3), Tc indicates a continuous-shooting interval [ms]; Ts, a scan operation time [ms]; Vh, the image-surface movement speed of the photographic subject [mm/s].

The scan driving range Ls in expression (2) indicates the amount of the movement of the focus lens 101 that is made in the imaging of a predetermined number of frames at a predetermined scan driving speed so as to detect the peak of the contrast (AF evaluation value) in a contrast AF operation. The scan driving range Ls [mm] is indicated by expression (4).

$$(Ls) = (Vs) \times (N) \times (Tf) \qquad \text{Expression (4)}$$

In expression (4), Vs indicates a scan driving speed [mm/s]; N, the number of frames; Tf, the period of driving time per frame [ms].

The scan driving operation is performed once during the shooting operation in a continuous shooting operation. To stabilize the continuous shooting speed, the scan driving operation that corresponds to the same number of frames is always performed. In particular, N=5 may be set as will be described hereinafter.

The "scan driving range required to detect a peak Lps" in expression (2) indicates the amount of the movement of the focus lens 101 that corresponds to the number of frames required to detect the peak of the contrast (AF evaluation value) in the contrast AF operation.

The calculation of a position such that the contrast reaches a peak needs processes such as an interpolation operation and an approximation function operation. Accordingly, the following descriptions are based on the assumption that the interpolation operation is performed using the highest (peak) AF evaluation value (contrast) and AF evaluation values that are lower than the peak and that sandwich the peak. In this case, the image data of the three frames, the frame indicating the highest AF evaluation value, the frame that temporally precedes that frame, and the frame that temporally follows that frame, are needed. In the case of, for example, three frames A, B, and C, the amount of the movement of the focus lens 101 made by driving the focus lens 101 while the three frames are being imaged corresponds to the amount of driving in two driving operations of "A→B" and "B→C". Accordingly, the "scan driving range required to detect a peak Lps" is indicated by expression (5).

$$(Lps) = (2 \text{ frames}) \times (Tf) \times (Vs) \qquad \text{Expression (5)}$$

Initial position driving is an operation to move the focus lens 101 in advance to an optimum position before the scan operation is started so that the peak of the contrast (AF evaluation value) of a photographic subject can be detected during the scan driving operation. The "amount of initial position driving Li" in expression (2) corresponds to the amount of the movement of the focus lens 101 made when the initial position driving is performed.

As described above, under a condition in which the scan driving speed Vs is set to a sufficient speed, optimizing the amount of initial position driving Li according to expression (2) allows an image obtained by putting the lens in focus on a photographic subject (moving body) moving back and forth to be always obtained at the timing of the main exposure.

In the embodiment, as an example, the continuous shooting speed is 10 scenes/s (continuous-shooting interval=10 ms), and Hmax, i.e., the maximum image-surface movement speed that can be handled by an automatic focus adjusting apparatus, is 5 mm/s. In this case, the amount of the image-surface movement Lh of a moving photographic subject that corresponds to a shooting time for one scene is 0.5 mm.

Conditions for the scan driving operation are set as follows. The direction of the scan driving operation is a direction such that an in-focus state becomes closer in accordance with a direction in which the moving photographic subject moves. That is, when the moving photographic subject approaches, the focus lens 101 is driven in a close direction in the scan driving operation. During the scan driving operation, the lens driving speed (scan driving speed Vs) is fixed at, for example, 48 mm/s.

The frame rate used during the scan driving operation is set to 240 fps (Tf=1/240), as described above, and "5" is set as the number of frames corresponding to the scan driving operation. Hence, according to expression (4), the amount of the movement (Ls) of the focus lens 101 made during the scan driving operation is Ls=1 mm (48[mm/s]×5[frames]/240[fps]) under image surface conversion. According to expression (5), the scan driving range required to detect a peak (Lps) is Lps=0.4 mm (48 [mm/s]×2 [frames]/240 [fps]) under image surface conversion.

Under the conditions above, the focus lens 101 can be actually operated, and the focus can be adjusted at a continuous shooting speed of 10 scenes/s by tracking a photographic subject moving at an image-surface movement speed (Vh) of 5 mm/s.

Figure 7:
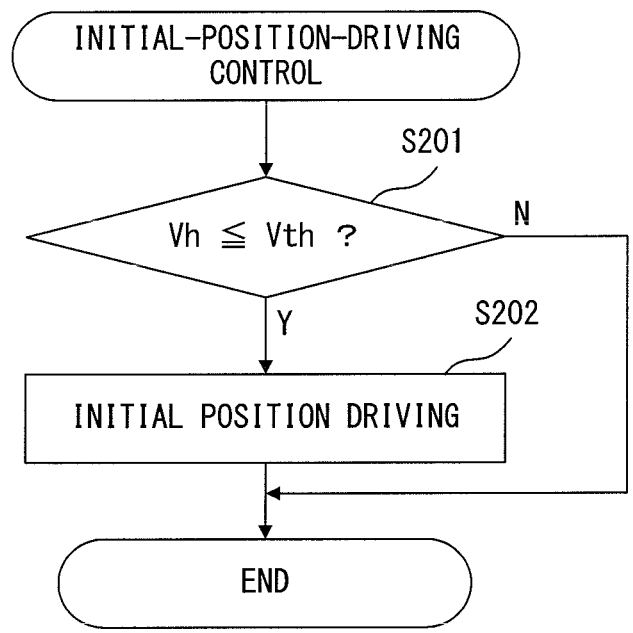
FIG. 7 is a flowchart illustrating exemplary processes performed for "initial position driving" by a focus adjusting apparatus in accordance with an embodiment of the invention.

With reference to FIG. 7, the following will describe the "initial-position-driving control" performed in step S104 of the flowchart in FIG. 2. The body controlling unit 203 determines whether the movement speed of a photographic subject is equal to or less than a predetermined value, and, in accordance with the result of the determination, determines to perform or to not perform the initial position driving.

In step S201, the photographic-subject-speed detection logic 203b of the body controlling unit 203 reads the parameter a stored in the storage unit and related to the movement speed of the photographic subject, and converts this parameter into an image-surface movement speed. When the image-surface movement speed Vh of the photographic subject is equal to or less than a threshold Vth (e.g., Vth=3 mm/s) (Vh☐EVth), the flow shifts to step S202.

In step S202, the body controlling unit 203 performs the initial position driving. Assume that the amount of the driving (Li) of the focus lens 101 is, for example, 0.2 mm under image surface conversion in the initial position driving and that the driving direction is opposite to the direction in the following scan driving operation.

Meanwhile, when the image-surface movement speed Vh of the photographic subject is greater than 3 mm/s in step S201, the flow ends without performing the initial position driving (Li=0).

When 5 mm/s is set as described above as the maximum image-surface movement speed Hmax of a moving photographic subject that makes the focus adjustment trackable under the automatic focus adjusting apparatus of the embodiment, treatments can be prepared by performing the scan driving operation indicated by expression (2) in accordance with one of the two options: an option of executing the amount of initial position driving Li and an option of not executing the amount of initial position driving Li.

The initial position driving is not performed when the image-surface movement speed of a photographic subject is greater than 3 mm/s. With reference to this situation, specific numerical relationships in expression (2) will be indicated in the following.

The right-hand side of expression (2)=0.6 mm, where Li (amount of initial position driving)=0, Ls (scan driving range)=1 mm, and Lps (scan driving range required to detect a peak)=0.4 mm. Meanwhile, only the range from 3 mm/s to 5 mm/s needs to be considered for the image-surface movement speed Vh of the photographic subject, and hence the left-hand side of expression (2)="the amount of image-surface movement of the photographic subject that moves before scan starts Lh"=0.21 mm to 0.35 mm (3 mm/s×71 ms to 5 mm/s×71 ms), thereby satisfying "left-hand side<right-hand side" in expression (2).

Since the scan driving range Ls is sufficiently greater than the amount of the image-surface movement Lh of the photographic subject, expression (2) is sufficiently satisfied, and the photographic subject may be reached on the image surface and an in-focus position may be detected by simply driving the focus lens 101 by five frames without performing initial position driving. Meanwhile, when the image-surface movement speed of the photographic subject Vh is less than 3 mm/s, the focus lens 101 is driven in the initial position driving by 0.2 mm in a direction opposite to the following scan driving direction.

With reference to this situation, specific numerical relationships in expression (2) will be indicated in the following.

The right-hand side of expression (2)=0.4 mm, where Li (amount of initial position driving)=−0.2 mm, Ls (scan driving range)=1 mm, and Lps (scan driving range required to detect a peak)=0.4 mm. Meanwhile, only the range from 0 to 3 mm/s needs to be considered for the image-surface movement speed of the photographic subject, and hence the left-hand side of expression (2)="the amount of image-surface movement Lh of the photographic subject that moves before scan starts"=0 to 0.21 mm (0 to 3 mm/s×71 ms), thereby satisfying "left-hand side<right-hand side" in expression (2).

In this way, performing the initial position driving also enables the peak position of a contrast (AF evaluation value) to be detected for a photographic subject whose photographic-subject movement speed is equal to or less than a predetermined value.

Figure 8:
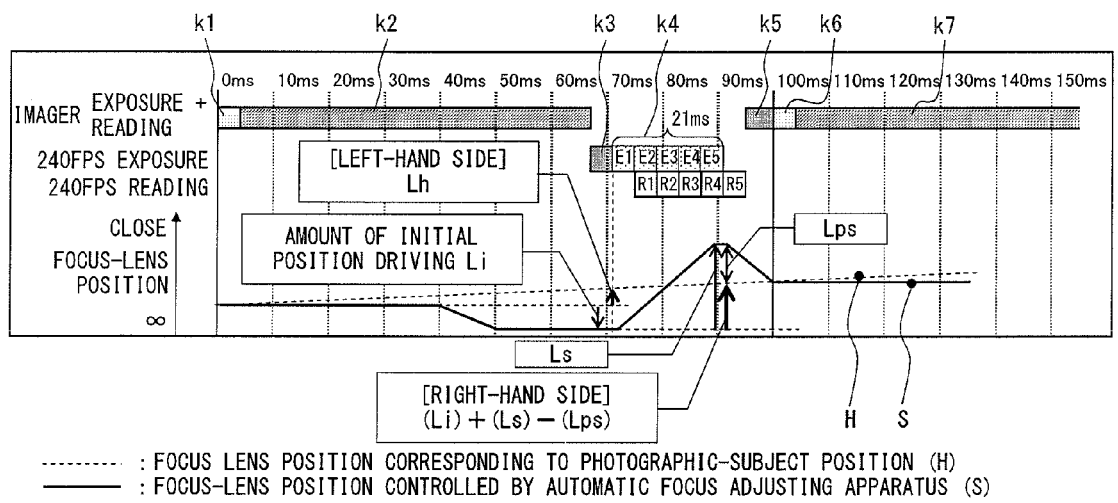
FIG. 8 illustrates another exemplary AF process performed during a continuous shooting operation of a focus adjusting apparatus in accordance with an embodiment of the invention.

FIG. 8 illustrates performing initial position driving in the AF operation during the continuous shooting operation. In a reading operation performed on the imager 201 after the main exposure operation is performed, the focus lens 101 is driven in an infinity direction by a predetermined amount during a section of t=40-50 ms on the abscissa. Making settings to satisfy expression (2) in this way allows the peak AF evaluation value to be detected.

As described above, in the embodiment of the invention, it is determined according to the photographic-subject movement speed whether to perform the initial position driving, thereby allowing the AF process to be precisely performed regardless of the photographic-subject movement speed.

The scan driving speed as well as the driving amount and the driving direction of initial position driving are treated as fixed values, and hence processes on the interchangeable-lens side and communication processes between the interchangeable lens and the camera body can be simplified. Accordingly, the period of time spend on performing a communication and the periods of time spend on performing processes on the interchangeable-lens side and the camera-body side can be shortened, and the speed of the AF controlling process can be enhanced.

In addition, in the continuous shooting operation, the AF tracking feature for a photographic object can be enhanced by performing the AF controlling process at a high speed.

In the embodiment, the scan driving speed as well as the driving amount and the driving direction of initial position driving are fixed values, but these values may be varied in accordance with the photographic-subject movement speed.

Embodiment 2

The following will describe embodiment 2 of the invention.

In embodiment 1, when the movement speed of a photographic subject is low, the lens is driven in initial position driving in a direction opposite to the direction in which the photographic subject moves; when the movement speed of a photographic subject is high, initial position driving is not performed.

Embodiment 2 is different in the following respects: when the movement speed of a photographic subject is high, the lens is driven in initial position driving in the same direction as the direction in which the photographic subject moves, and, when the movement speed of a photographic subject is low, initial position driving is not performed.

In embodiment 2, the lens driving speed for the focus lens 101 is lower than that in embodiment 1. Such an arrangement is made, for example, in consideration of lower-priced interchangeable lenses 100 and low-performance interchangeable lenses 100 sold in the past and in consideration of a situation in which the lens driving unit 102 for the focus lens 101 is tailored for a specification for a lower speed.

Due to the lower driving speed for the focus lens 101, i.e., the lower scan driving speed Vs, in comparison with the case in embodiment 1, a photographic subject moving at a higher speed, i.e., a photographic subject with a higher image-surface movement speed Vs, cannot be tracked, leading to a problem wherein the peak AF evaluation value cannot be detected.

Figure 9:
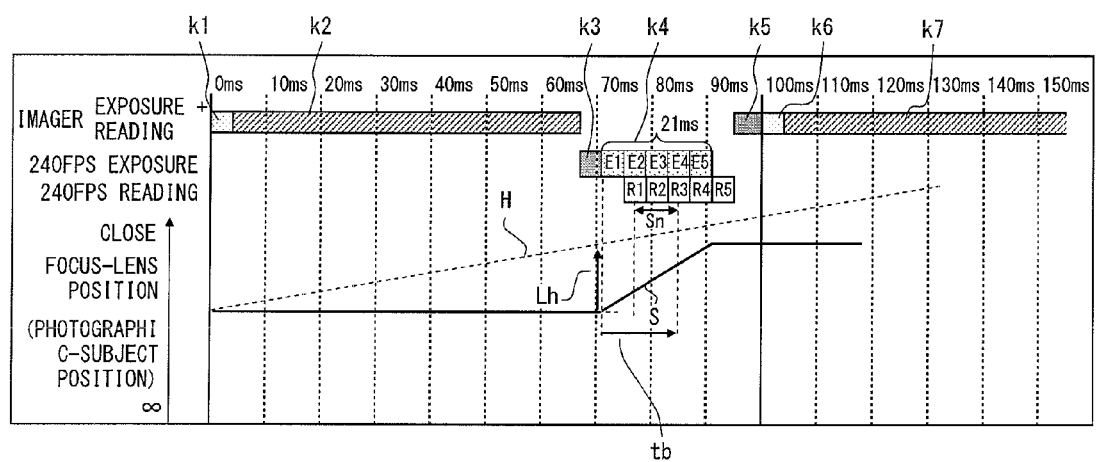
FIG. 9 illustrates another exemplary AF process performed during a continuous shooting operation of a focus adjusting apparatus in accordance with an embodiment of the invention.

The time range Sn in FIG. 9 indicates the accumulation times of the middle three charge accumulating operations (E2-E4) from among five consecutive accumulating operations performed during the scan driving operation. The time range Sn in FIG. 9 indicates a range where the peak AF evaluation value needs to be located so that this value can be detected in the scan driving operation. The peak position of the AF evaluation value that corresponds to an in-focus position is calculated in an interpolation operation as described above, and hence, when the two outermost AF evaluation values from among the five AF evaluation values determined in the scan driving operation become highest, the peak AF evaluation value cannot be detected. Alternatively, it is not possible to determine whether the highest AF evaluation value is a peak, and hence this value cannot be used.

In the case of the scan driving amount profile S that indicates the scan driving operation, the scan driving amount profile S and the photographic-subject movement amount profile H do not intersect with each other within the time range Sn, as illustrated in FIG. 9, and hence the peak AF evaluation value cannot be detected in the scan driving operation.

Accordingly, in embodiment 2, to solve the aforementioned technical problem, the lens is driven in initial position driving in the same direction as a direction in which a photographic subject moves.

Figure 10:
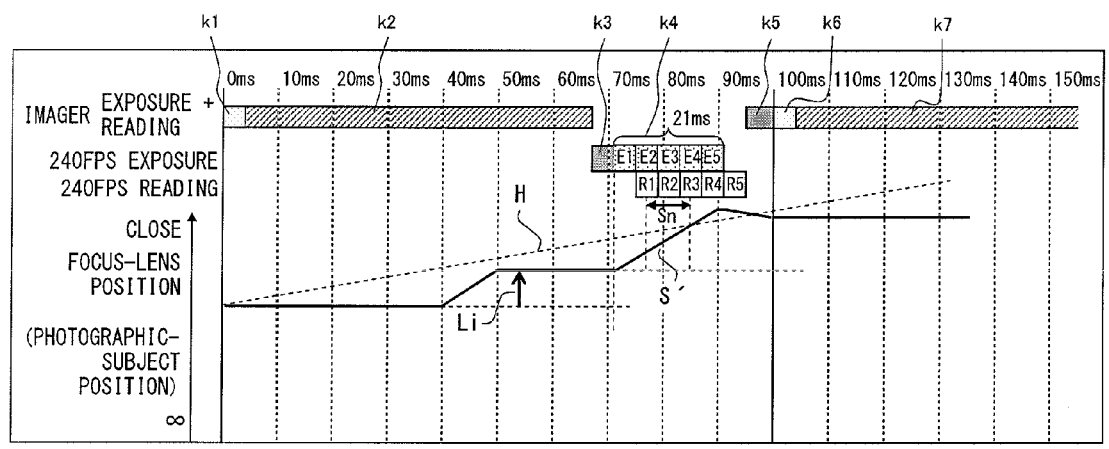
FIG. 10 illustrates another exemplary AF process performed during a continuous shooting operation of a focus adjusting apparatus in accordance with an embodiment of the invention.

FIG. 10 depicts a situation in which, with respect to the photographic-subject movement amount profile H of the same image-surface movement speed as that in FIG. 9, the direction of initial position driving is set to a direction from "infinity" to "close" (a direction opposite to the direction indicated in FIG. 8), and the driving amount of initial position driving (Li) is set such that the photographic-subject movement amount profile H and the scan driving amount profile S' intersect with each other within the time range Sn.

When the image-surface movement speed Vh of a photographic subject is high (i.e., when the inclination of the photographic-subject movement amount profile H is large) as illustrated in FIG. 10, the driving amount (Li) of initial position driving is properly set, initial position driving is performed to drive the lens in a direction such that the scan driving amount profile S' approaches the photographic-subject movement amount profile H, and then the scan driving operation is performed. Accordingly, the scan driving amount profile S' and the photographic-subject movement amount profile H intersect with each other so that the peak AF evaluation value can be detected.

Figure 11:
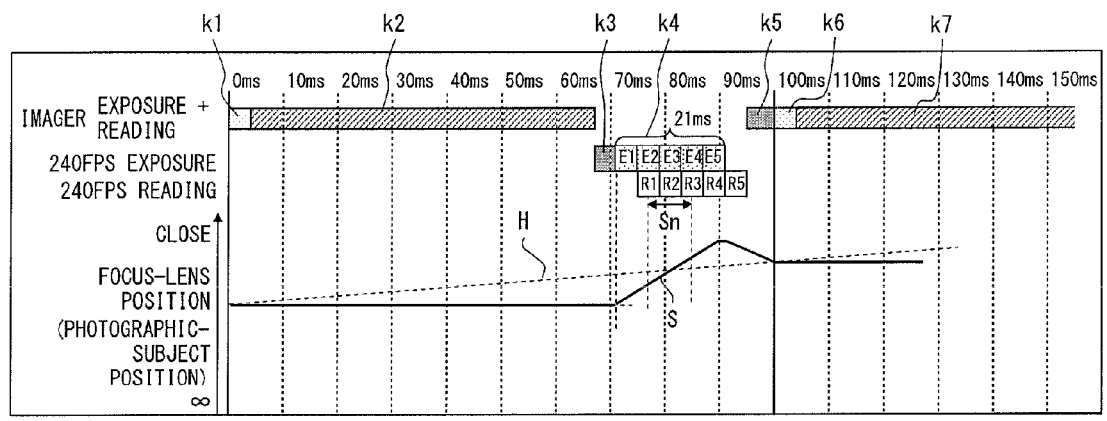
FIG. 11 illustrates another exemplary AF process performed during a continuous shooting operation of a focus adjusting apparatus in accordance with an embodiment of the invention.

When the image-surface movement speed is lower (when the inclination of the photographic-subject movement amount profile H is smaller than that in FIG. 10) as illustrated in FIG. 11, the image-surface movement speed is compared with a predetermined threshold, and the peak AF evaluation value can be detected without performing initial position driving.

The following will describe a method for determining whether to perform the described initial position driving.

The initial position driving is performed when expression (6) is satisfied, where Lh indicates the amount of the image-surface movement of a photographic subject that moves before the scan driving operation starts [mm]; Vs, scan driving speed [mm/s]; tb, the period of time from the start of the scan driving to the middle of the exposure of the charge accumulation E4 [s].

$$Lh/Vs > tb \qquad \text{Expression (6)}$$

tb corresponds to the upper limit of the time range Sn, and an amount of image-surface movement of the photographic subject is large, i.e., a value of an amount of image-surface movement Lh of the photographic subject is high; initial position driving is performed when expression (6) is satisfied and, as illustrated in FIG. 9, an intersection between the photographic-subject movement amount profile H and the scan driving amount profile S is not included in the range that follows the time range Sn.

The "amount of the image-surface movement of a photographic subject that moves before the scan driving operation starts" is, to be exact, a position based on the abscissa and corresponding to an intersection between the photographic-subject movement amount profile H and the scan driving amount profile S, but Lh, the amount of the image-surface movement of the photographic subject that moves before the scan driving operation starts, is used instead. As the image-surface movement speed Vh of the photographic subject becomes higher, the extent of an error resulting from the use of Lh becomes larger. Accordingly, when the image-surface movement speed Vh of the photographic subject is greater than a predetermined value, the amount of movement of the photographic subject at the time of the intersection between the photographic-subject movement amount profile H and the scan driving amount profile S may be used instead of the amount of the image-surface movement Lh of the photographic subject that moves before the scan driving operation starts.

Expression (6) is used to determine whether an intersection between the photographic-subject movement amount profile H and the scan driving amount profile S is not included in the range that follows the time range Sn; however, it may be determined whether the intersection is located prior to and not located within the time range Sn, and initial position driving may be performed to drive the lens in the opposite direction.

Figure 12:
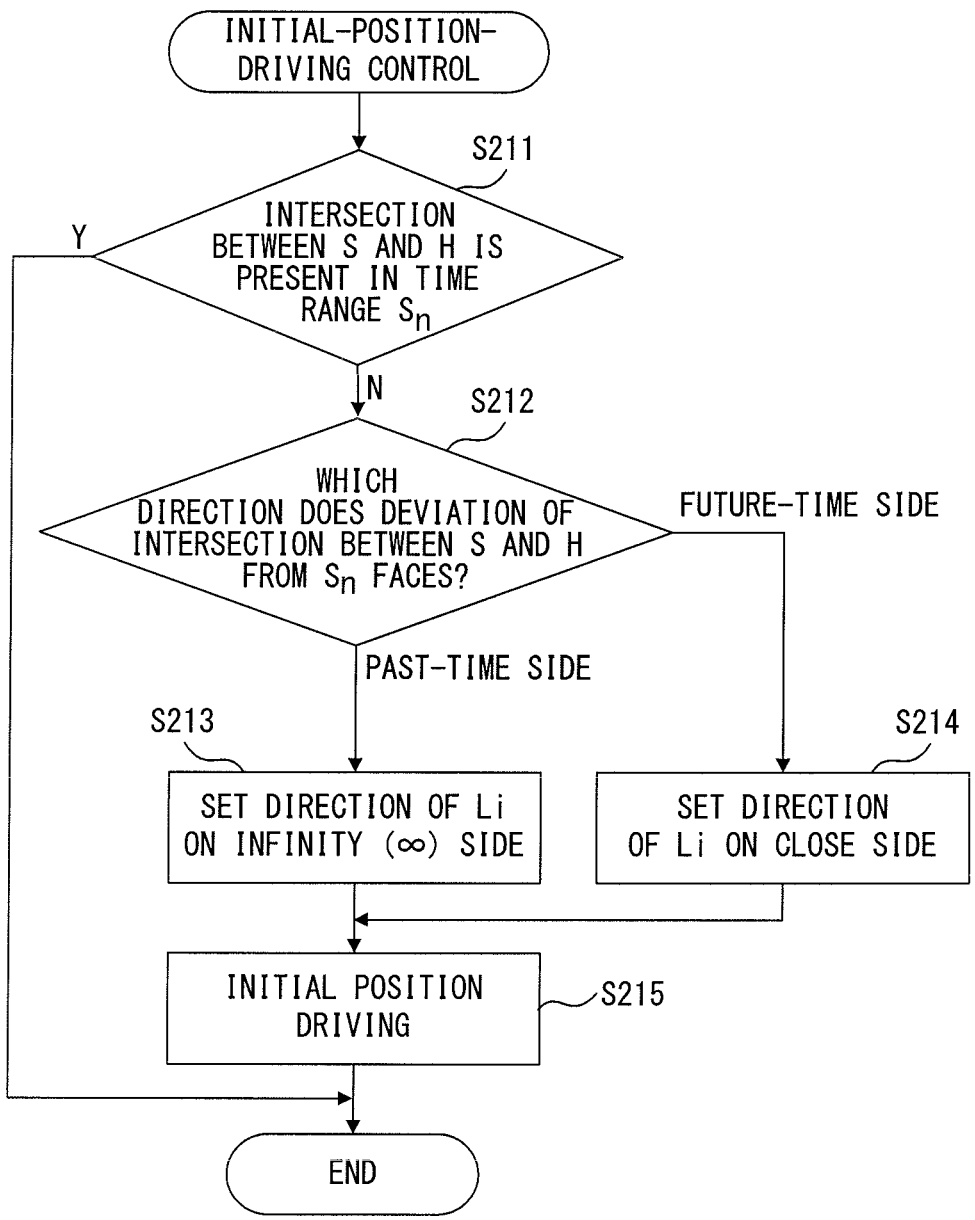
FIG. 12 is a flowchart illustrating an exemplary process of comprehensively determining the necessity to perform initial position driving by a focus adjusting apparatus in accordance with an embodiment of the invention.

FIG. 12 is a flowchart illustrating an example of a comprehensive process of determining whether the initial position driving of embodiment 2 needs to be performed, wherein the process is performed in step S104 in FIG. 2.

First, it is determined whether an intersection between the scan driving amount profile S and the photographic-subject movement amount profile H is located within the time range Sn (step S211).

When the intersection is located within the time range Sn, initial position driving is not performed.

Meanwhile, when it is determined in step S211 that an intersection between the photographic-subject movement amount profile H and the scan driving amount profile S is not located within the time range Sn, it is determined which of the past-time side (left-hand side of FIGS. 8-11) or the future-time side (right-hand side) of the temporal axis the intersection deviating from the time range Sn is located on (step S212).

When it is determined in step S212 that the intersection is located on the past-time side, the amount of initial position driving Li is set on the infinity (∞) side (step S213). In the case of step S213, the inclination of the photographic-subject movement amount profile H (i.e., image-surface movement speed Vh of the photographic subject) is relatively small in comparison with the inclination of the scan driving amount profile S (i.e., scan driving speed Vs).

Meanwhile, when it is determined in step S212 that the intersection is located on the future-time side, the amount of initial position driving Li is set on the close side (step S214).

In the case of step S214, the inclination of the photographic-subject movement amount profile H (i.e., image-surface movement speed Vh of the photographic subject) is relatively large in comparison with the inclination of the scan driving amount profile S (i.e., scan driving speed Vs).

Initial position driving is performed to drive the focus lens 201 in the direction set in step S213 or S214 (step S215).

As described above, in embodiment 2 of the invention, it is determined in accordance with the photographic-subject movement speed whether to perform initial position driving, and, when the speed is high, initial position driving is performed. In this case, to compensate a relatively low scan driving speed Vs, initial position driving is performed to drive the focus lens 101 from the infinity side to the close side. This allows the peak position of the AF evaluation value to be detected for a faster photographic subject, so that the AF process can be precisely performed regardless of the photographic-subject movement speed.

Even in the case of using, for example, a low-priced interchangeable lens 100 wherein the focus lens 101 is driven at a lower speed or a low-performance interchangeable lens 100 sold in the past, the AF process can be precisely performed by tracking a fast photographic subject.

In addition, in the embodiment, the frame rate of the imager 201 is fixed (240[fps]) during the scan driving operation. However, the movement speed of the focus adjustment lens, the direction of initial position driving, and the amount of the driving of the lens may be properly set in accordance with the frame rate so as to detect the peak AF evaluation value regardless of the image-surface movement speed Vh of a photographic subject, thereby enabling the AF process to be precisely performed.

The invention is not limited to the configurations illustrated with reference to the aforementioned embodiments. Needless to say, the invention may be variously changed without departing from the spirit thereof. Even when an operation flow in the claims, the Specification, or the drawings is described using the term such as "first" or "next" for convenience, such a flow does not necessarily need to be performed in such an order.

The invention may provide a focus adjusting technology for improving the performance to track a moving body during the continuous shooting operation and for enabling fast and precise focus adjustment.

What is claimed is:

1. A focus adjusting apparatus that controls movement of a focus lens movable in an optical axis direction and included in a photographing optical system that forms an image from light from a photographic subject, the focus adjusting apparatus comprising:
   an imager that generates an image signal by imaging a photographic-subject image formed by the photographing optical system;
   a lens driving unit that moves the focus lens; and
   a controlling unit that causes the lens driving unit to move the focus lens, that causes the imager to perform an imaging operation, that performs a scan operation so as to detect, on the basis of the image signal output by the imager, a position where the focus lens is to be located to cause a contrast of the photographic-subject image to reach a peak, and that controls locating of the focus lens at a position where the focus lens is in focus, wherein the controlling unit includes
   a photographic-subject-speed detecting unit that detects a movement speed of the photographic subject, and
   a scan controlling unit that, based on the movement speed of the photographic subject detected by the photographic-subject-speed detecting unit, determines whether to perform initial position driving to move the focus lens before the scan operation is performed.

2. The focus adjusting apparatus according to claim 1, wherein
   the scan controlling unit makes a setting to perform the initial position driving when the movement speed of the photographic subject detected by the photographic-subject-speed detecting unit is less than a predetermined threshold, and makes a setting to not perform the initial position driving when the movement speed of the photographic subject detected by the photographic-subject-speed detecting unit is greater than the predetermined threshold.

3. The focus adjusting apparatus according to claim 2, wherein
   the scan controlling unit makes a setting to drive the focus lens in a direction from a close side to an infinity side in the initial position driving when the movement speed of the photographic subject is less than the predetermined threshold.

4. The focus adjusting apparatus according to claim 2, wherein based on the movement speed of the photographic subject, a movement speed of the focus lens in the scan driving, and a frame rate of the imaging operation, the scan controlling unit makes a setting to perform or to not perform the initial position driving.

5. The focus adjusting apparatus according to claim 1, wherein when the movement speed of the photographic subject detected by the photographic-subject-speed detecting unit is greater than a predetermined threshold, the scan controlling unit makes a setting to perform the initial position driving and makes a setting to drive the focus lens in a direction from an infinity side to a close side in the initial position driving.

6. The focus adjusting apparatus according to claim 1, wherein the scan controlling unit performs the scan operation during an interval between the imaging operation and a reading operation on the imager, both repeatedly performed in continuous shooting, and performs the initial position driving during the reading operation on the imager.

7. A camera system including a camera body on which an interchangeable lens is mountable, the interchangeable lens including a focus lens movable in an optical axis direction and included in a photographing optical system that forms an image from light from a photographic subject, and a lens driving unit to move the focus lens, wherein the camera body includes
an imager that generates an image signal by imaging a photographic-subject image formed by the photographing optical system, and
a controlling unit that instructs the interchangeable lens to cause the lens driving unit to move the focus lens, that causes the imager to perform an imaging operation, that performs a scan operation so as to detect, on the basis of a plurality of image signals output by the imager, a position where the focus lens is to be located to cause a contrast of the photographic-subject image to reach a peak, and that controls locating of the focus lens at a position where the focus lens is in focus, wherein the controlling unit includes
a photographic-subject-speed detecting unit that detects a movement speed of the photographic subject, and
a scan controlling unit that, based on the movement speed of the photographic subject detected by the photographic-subject-speed detecting unit, makes a setting to perform or to not perform initial position driving to move the focus lens before the scan operation is performed, and that gives the interchangeable lens an instruction.

8. The camera system according to claim 7, wherein
the scan controlling unit makes a setting to perform the initial position driving when the movement speed of the photographic subject detected by the photographic-subject-speed detecting unit is less than a predetermined threshold, and makes a setting to not perform the initial position driving when the movement speed of the photographic subject detected by the photographic-subject-speed detecting unit is greater than the predetermined threshold.

9. The camera system according to claim 8, wherein
the scan controlling unit makes a setting to drive the focus lens in a direction from a close side to an infinity side in the initial position driving when the movement speed of the photographic subject is less than the predetermined threshold.

10. The camera system according to claim 8, wherein
based on the movement speed of the photographic subject, a movement speed of the focus lens in the scan driving, and a frame rate of the imaging operation, the scan controlling unit makes a setting to perform or to not perform the initial position driving.

11. The camera system according to claim 7, wherein
when the movement speed of the photographic subject detected by the photographic-subject-speed detecting unit is greater than a predetermined threshold, the scan controlling unit makes a setting to perform the initial position driving and makes a setting to drive the focus lens in a direction from an infinity side to a close side in the initial position driving.

12. The camera system according to claim 7, wherein
the scan controlling unit performs the scan operation during an interval between the imaging operation and a reading operation on the imager, both repeatedly performed in continuous shooting, and performs the initial position driving during the reading operation on the imager.

13. A focus adjusting method for a camera system that includes a camera body on which a photographing optical system is mountable, the photographing optical system including a focus lens movable in an optical axis direction, and forming an image from light from a photographic subject, and the focus adjusting method comprising the steps of:

calculating a movement speed of the photographic subject from a plurality of past in-focus positions for the photographic subject recorded in chronological order;
in determining an in-focus position for the photographic subject by performing a certain amount of scan driving of the focus lens at a certain speed, determining based on the movement speed of the photographic subject whether to perform initial position driving of the focus lens prior to the scan driving;
moving the focus lens to the in-focus position determined according to the scan driving; and
imaging the photographic subject.

14. The focus adjusting method according to claim 13, wherein
based on the movement speed of the photographic subject under image surface conversion, a movement speed of the focus lens in the scan driving under the image surface conversion, and a frame rate used in the imaging of the photographic subject, a driving amount and a driving direction of the initial position driving are set under the image surface conversion.

* * * * *